United States Patent [19]

Parsons

[11] 4,099,258
[45] Jul. 4, 1978

[54] SYSTEM OF DATA STORAGE

[75] Inventor: Robert Parsons, St. Neots, England

[73] Assignee: Texas Instruments Incorporated, Dallas, Tex.

[21] Appl. No.: 731,249

[22] Filed: Oct. 12, 1976

[30] Foreign Application Priority Data

Oct. 8, 1975 [GB] United Kingdom ............ 41217/75

[51] Int. Cl.² ............................................ G06F 13/06
[52] U.S. Cl. .................................. 364/900; 358/188
[58] Field of Search ....... 340/173 RC, 324 R, 324 M; 364/900, 200; 358/102, 188; 307/238

[56] References Cited

U.S. PATENT DOCUMENTS

| | | | |
|---|---|---|---|
| 3,623,005 | 11/1971 | Roberts | 364/900 |
| 3,704,452 | 11/1972 | Beausoleil et al. | 307/238 |
| 3,820,082 | 6/1974 | Bauknecht et al. | 364/200 |
| 3,824,551 | 7/1974 | Arciprete et al. | 364/200 |
| 3,911,407 | 10/1975 | Greek, Jr. et al. | 364/900 |
| 4,010,451 | 3/1977 | Kibble et al. | 364/200 |

Primary Examiner—Leo H. Boudreau
Attorney, Agent, or Firm—Rene'E. Grossman; Richard L. Donaldson; James T. Comfort

[57] ABSTRACT

In a Teletext transmission system data is transmitted in digital form during lines in the field blanking period of the composite video signal of a television transmission. On reception the information is decoded to generate a display comprising a page having a predetermined number of rows of information in alphanumeric or graphics form. The data is received in blocks comprising information digits each block associated with a respective group of two-part address inputs, one part providing page identification and the other data row information. A plurality of serially accessed data storage registers is provided for the data rows, each uniquely corresponding to a selected one of the two-part address digits. A decoder is responsive to transmitted address data to independently address the corresponding shift register via a first switch to write data into the store and is responsive to address data to read data from a selected register via a second switch for display generation. Data entered into the shift register may be recirculated until required for display. Transmission of data rows out of page and row number sequence is thus accommodated so that only data rows containing information and data rows needing updating need be transmitted.

14 Claims, 1 Drawing Figure

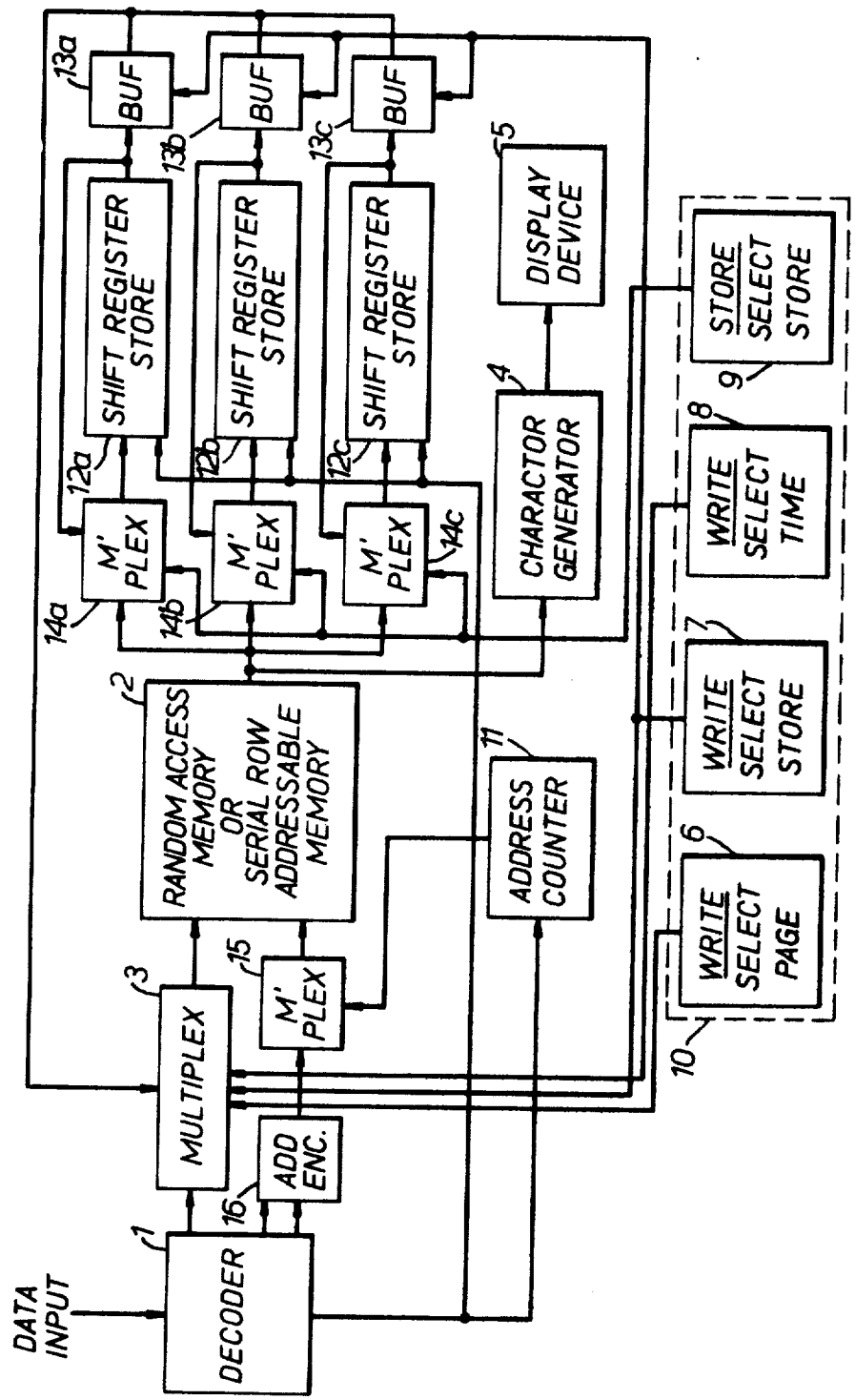

SYSTEM OF DATA STORAGE

This invention relates to apparatus for storing digitally coded data for display as pages of, for example, alphanumeric data on a television screen as an alternative to a normal television picture.

It has been proposed to use spare line periods during the field flyback periods of a television signal for the transmission of binary coded alphanumeric and other data, and in such a system the data would need to be stored in a television receiver in order to be displayed by it because a "page" of data could be accumulated over several fields, and a static display is required. One such system is disclosed by British patent specification No. 1370535. The transmitted data is provided with page and row address codes to permit the information to be correctly assembled at the receiver and displayed as pages made up of rows of alphanumeric characters. It is therefore desirable to provide in television receiving apparatus for use with such a data transmission system a data store which is capable of assembling the row addressed data. Moreover, such a store should be competitively priced.

The binary coded alphanumeric data which is to be displayed at the receiver as pages of information arranged as rows is usually transmitted row by row, but the rows might not be in sequence. A row required to be left blank might not be transmitted. There will be no gap in the transmission of rows, but the data store at the receiver must be able to handle such data and produce from it the required display with a blank row.

It is an object of the present invention to provide a data store suitable for use in a data transmission system as described above.

According to the invention a multi-address digital data store includes an input circuit for receiving input data comprising a plurality of blocks of digits representing information and associated with each block a respective group of digits representing a two-part address, a decoder connected to respond to the groups of digits to produce address selection signals corresponding first parts of the addresses, a first store connected to receive the blocks of digits and store them at addresses determined by the address selection signals, selector means arranged to permit storage by the first store of only those blocks of digits having associated therewith a particular second part address, serial access storage means of capacity several times that of the first store, and transfer means for transferring blocks of digits from the first store to the serial access storage means in a predetermined order of addresses of the first store.

The serial access storage means may be a shift register store and may have a capacity of a number of pages of information. The first store need have the storage capacity for only one page of information.

The serial access storage means may be provided by a recirculating type of store such as one employing charge coupled devices or magnetic bubbles. The serial access store may be organized in a number of ways. It may be arranged as a single row which accommodates in serial form the information of several fully populated pages, it may handle the digits representing a character in parallel and have a large number of rows corresponding to the rows of a number of fully populated pages, or the rows of parallel groups of digits may themselves be in parallel so that the pages are effectively in parallel.

The data is entered into the serial access store along with page address to facilitate location of the rows subsequently or the rows may be located by counting the clock pulses to the register. A missing row may appear as a series of binary words representing displayed blanks at locations in the serial access store.

The multi-address digital data store may be coupled to a character generator and a display device such as a cathode ray tube display, or alternatively, a matrix of display devices may be used to display the characters represented by the digital data. A television type display, that is, a raster scan display may be utilized, the characters being portrayed by a pattern of dots, black on a white background, white on a black background, or one color on another.

A multi-address digital data store in accordance with the invention will now be described by way of example only and with reference to the accompanying drawing which is a diagrammatic representation of a data store and display.

Referring to the FIGURE, the multi-address digital data store shown includes a decoder 1 which separates the information part of the signal from the address part. A random access memory 2 organized to store the digital data provides fast storage being capable of matching the rate of incoming data which is stored in the memory 2 as rows making up a page. The capacity of the random access memory 2 is equivalent to a single complete page of data. A serial access store is provided by a shift register store consisting of three parts 12a, 12b, and 12c each capable of storing a page of data. The stored data is recirculated continuously within each part of the shift register store. An address counter 11 monitoring the new addresses of incoming data ensures the loading of the data into correct addresses of the random access memory 2. The erasure of data stored at addresses corresponding to any blank rows of incoming data is achieved by clearing the store before reception of new data.

Display of data in the data store is effected by means of a character generator 4 and a display device 5. Control of the data store is effected by the control group 10 which includes controls 6, 7, 8, and 9. The controls 6, 7, 8, and 9 enable selection of the page or pages of data to be stored. Selection is by means of multiplexers 3, 14a, 14b, and 14c which together control the movement of incoming and stored data.

The WRITE SELECT PAGE control 6 causes the multiplexer 3 to pass to the memory 2 incoming data relating to the page selected whenever it is received, and permits the rows of the selected page to be loaded into corresponding addresses of the random access memory 2.

The data stored in the random access memory 2 is applied sequentially to the character generator 4 which causes the data to be displayed on the display device 5. Data entry into the random access memory 2 erases data already held there. If it is desired to transfer the data stored in the random access memory 2 into one of the shift register stores 12a to 12c, then operation of the STORE SELECT STORE control 9 activates the appropriate one of multiplexers 14a, 14b, and 14c to admit data from random access memory 2 to the selected part 12a, 12b, or 12c of the shift register store.

Operation of the WRITE SELECT STORE control 7 permits retrieval of the data stored in the selected part of the shift register store by enabling one of the buffers 13a, 13b, or 13c which then permits flow of the data to multiplexer 3 for reinsertion into the random access memory 2 and subsequent display via the character generator 4 on display 5. The input of data via the decoder 1 into the memory 2 is inhibited by the multiplexer 3 during data retrieval from the shift register store.

The WRITE SELECT TIME control 8 provides means for selecting data having a particular page number from the incoming data at a selected time and entering it in the memory 2, the data then being displayed on display 5. A suitable clock and some switching arrangement would be necessary for the implementation of this control.

The multiplexer 3 is adapted to respond to coded input from the control group 10 and to route information either from the decoder 1 or from a part of the shift register store into the memory 2. The multiplexer 3 also recognizes page codes with data coming in from the decoder 1 so as to respond to the WRITE SELECT PAGE control 6. The WRITE SELECT TIME control 8 includes a store for storing a preset time or times entered by the user. This time is compared with incoming data which includes a time code. When the codes are in agreement the incoming data is stored for subsequent display.

An address encoder 16 generates codes suitable for controlling a controllable switch 15 which provides address selection for the random access memory 2. The row address codes transmitted with the data may not be in a form suitable for selecting memory addresses and therefore must be modified or changed completely for selecting addresses of the random access memory 2. This function is performed by the address encoder 16.

In operation, data from a demodulator data slicer, for example, appears as pulses on the input to the decoder 1, which separates the two-part address of the data stream from the information part. Incoming data is not applied to the random access memory 2 unless one of the programming controls 6, 7, 8, or 9 is operative. If the WRITE SELECT PAGE control 6 is operative, then the multiplexer 3 compares the incoming page identification codes with that presented by the WRITE SELECT PAGE control 6, and admits the corresponding data from the decoder 1 into the random access memory 2 when the page identification code matches that emitted by the SELECT PAGE control 6. The random access memory 2 then accepts the data under the control of the controllable switch 15 which, along with the address encoder 16 and the address counter 11, places the data in the addresses of the random access memory 2 on a row by row basis making up a page. Any missing data appears as binary words representing displayed blanks in the random access memory 2. Address codes are stored with the data to permit identification if and when the data in the random access memory 2 is subsequently stored in a part 12a, 12b, or 12c of the shift register store. Data stored in the random access memory 2 is automatically displayed as characters on the display device 5 by the character generator 4. The data in the random access memory 2 may be transferred to a part 12a, 12b, or 12c of the shift register store and held therein by operation of the STORE SELECT STORE control 9. The data is transferred serially into the selected part of the shift register store by enabling the one of store entry switches 14a, 14b, or 14c selected by the control 9. The shift register store may be a charge coupled device store or magnetic bubble store in which information is circulated continuously.

The WRITE SELECT PAGE and WRITE SELECT STORE operations provided by controls 6 and 7 both produce displays but the store address codes may be quite different from the incoming page address codes. For instance, store address codes may be three-digit codes (100 to 132, say, for 32 pages) while incoming address codes may be one or two-digit codes (1 to 32) for the same data. Operation of the WRITE SELECT STORE control 7 transfers data from one part 12a, 12b, or 12c of the shift register store by enabling one of the buffers 13a, 13b, or 13c and causing the multiplexer 3 to pass the data from the shift register store to the random access memory 2 for display. On the other hand the WRITE SELECT PAGE control 6 involves the entry into the memory 2 of the selected page of data from the data input via the decoder 1 as described above.

The WRITE SELECT TIME control 8 provides a means for selecting information for entering into the random access memory 2 at a selected time and display at that time. The WRITE SELECT TIME control 8 therefore includes a clock, preferably an electronic clock which may be programmed to open the multiplexer 3 at a chosen time to admit the information transmitted for a certain period beginning at that time. The period for which the WRITE SELECT TIME control 8 will hold open the multiplexer 3 would be the transmission time for a page. Alternatively or additionally, the WRITE SELECT TIME control 8 and the WRITE SELECT PAGE control 6 may be arranged to control the multiplexer 3 to effect reading into the random access memory 2 a selected page in a selected time slot. In this arrangement the WRITE SELECT TIME control 8 may partly enable the multiplexer 3 for a period corresponding to the time requested to transmit the full number of pages available and the WRITE SELECT PAGE control 6 then fully opens the multiplexer 3 to admit the required data.

Although a random access memory 2 is referred to in the specific embodiment, the function may be performed by a row addressable store. In such a store data in each row may be entered or accessed serially but any row may be addressed at random. In other arrangements of a data store performing the prescribed function the data in each row may be entered or accessed in parallel, while any row may be addressed at random.

The character generator 4 may, for example, be constructed as disclosed in application Ser. No. 708,524 filed July 26, 1976, by Denis Frank Spicer and assigned to Texas Instruments Incorporated, assignee of the present application.

What is claimed is:

1. A multi-address digital data store for storing at appropriate addresses in the store blocks of digits representing information, including input circuit means for receiving input data comprising blocks of information digits each representing a data row of a data page having a plurality of data rows, each said block having an associated group of address digits representing an address comprising first and second parts; decoder means connected for response to said groups of address digits to produce address selection signals corresponding to said first parts of said addresses, first store means having a capacity equivalent to a single full page of information digit rows and connected to receive said blocks of information digits for storage at addresses determined by said address selection signals; selector means for permitting storage by said first store means only of those said blocks of information digits having associated therewith a particular second part address; serial access storage means having storage capacity several times that of said first store means; and transfer means for transferring blocks of information digits from said first store means to a selected part of said serial access storage means in a predetermined order of addresses of said first store.

2. A data store according to claim 1, including means for transferring data from a selected part of said serial access storage means into said first store means.

3. A data store according to claim 1, wherein said serial access storage means comprises a shift register store.

4. A data store according to claim 1, wherein said serial access storage means comprises a plurality of parallel organized shift register stores.

5. A data store according to claim 1, wherein said serial access storage means comprises a charge transfer device storage means.

6. A data store according to claim 1, wherein said serial access storage means comprises magnetic bubble data storage means.

7. A data store according to claim 1, wherein said first store means is a random access store.

8. A data store according to claim 1, wherein said first store means is a row addressable store.

9. A multi-address digital data store according to claim 1, including means for entering a memory address into said first store means with said input data and for transferring said memory address to the serial access storage means together with that said data.

10. A data store according to claim 1, in combination with character generator means for generating dot patterns corresponding to blocks of digits stored in said data store, and display means coupled to said character generator means for receiving and displaying said dot patterns as alphanumeric or graphics characters.

11. In television broadcast receiver apparatus including display means and data extraction means for extracting input data from a composite broadcast signal received by said receiver, said input data comprising blocks of information digits each representing a data row of a data page having a plurality of data rows, each block having an associated group of address digits comprising a first part address representing a page number and a second address part representing a data row number on a page; a multi-address digital data store for storing at appropriate addresses in said store blocks of said information digits and including: decoder means connected for response to said groups of address digits to produce address selection signals corresponding to said first address parts, first store means having a capacity equivalent to a single full page of information digits and connected to receive said blocks of information digits for storage at addresses determined by said address selection signals; selector means for permitting storage by said first store means only of said blocks of information digits having associated therewith a particular first address part; serial access storage means having storage capacity several times the storage capacity of said first store means; first transfer means for transferring blocks of information digits from said first store means to a selected part of said serial access storage means in a predetermined order of addresses of said first store means; second transfer means for transferring data from a selected part of said serial access storage means into said first store means; and character generator means coupled to said digital data store for receiving blocks of said information digits therefrom, said display means coupled to said character generator means for response thereto to display alphanumeric and/or graphics characters determined by said blocks of information data.

12. Apparatus according to claim 11, including means for entering a memory address into said first store means with said input data and for transferring said memory address to the serial access storage means together with that said data.

13. Apparatus according to claim 12, wherein said serial access storage means comprises a shift register store and said first store means is a random access store.

14. In combination with television broadcast receiver apparatus, multi-digital data storage means comprising data extraction means for extracting input data from a composite broadcast signal received by said receiver, said input data comprising blocks of information digits each representing a data row of a data page having a plurality of data rows, each block having an associated group of address digits comprising a first part address representing a page number and a second address part representing a data row number on a page; decoder means connected for response to said groups of address digits to produce address selection signals corresponding to said first address parts; first store means having a capacity equivalent to a single full page of information digits and connected to receive said blocks of information digits for storage at addresses determined by said address selection signals; selector means for permitting storage by said first store means only of said blocks of information digits having associated therewith a particular first address part; serial access storage means having storage capacity several times the storage capacity of said first store means; first transfer means for transferring blocks of information digits from said first store means to a selected part of said serial access storage means in a predetermined order of address of said first store means; second transfer means for transferring data from a selected part of said serial access storage means into said first store means; and character generator means coupled to said digital data store for receiving blocks of said information digits therefrom to generate data display signals corresponding to alphanumeric and/or graphics characters determined by said blocks of information data.

* * * * *